T. BOYD.
Corn Harvester.
No. 52,819.
Patented Feb. 27, 1866.
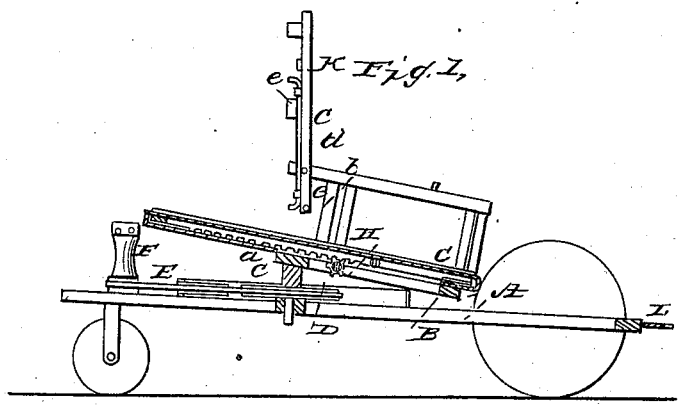
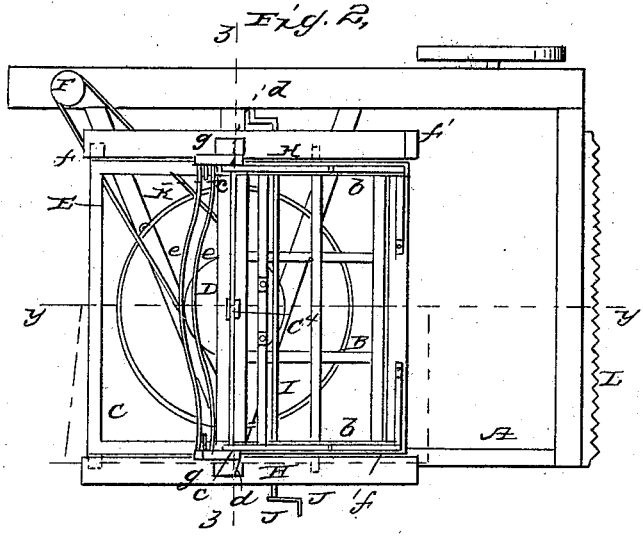
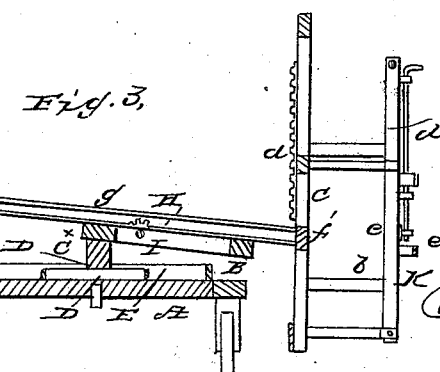
Witnesses:
Inventor:
Thos Boyd
Munn & Co
Attorneys

UNITED STATES PATENT OFFICE.

THOMAS BOYD, OF DES MOINES, IOWA.

IMPROVEMENT IN CORN-HARVESTERS.

Specification forming part of Letters Patent No. 52,819, dated February 27, 1866.

*To all whom it may concern:*

Be it known that I, THOMAS BOYD, of Des Moines, in the county of Polk and State of Iowa, have invented a new and Improved Machine for Shocking Corn; and I do hereby declare that the following is a full, clear, and exact description thereof, which will enable those skilled in the art to make and use the same, reference being had to the accompanying drawings, forming part of this specification, in which—

Figure 1 is a side sectional view of a harvester with my invention applied to it, the harvester being taken in the line $x\,x$ and the invention in the line $y\,y$, Fig. 2; Fig. 2, a plan or top view of the same with the parts in a working position; Fig. 3, a transverse vertical section of the harvester and my invention, taken in the line $z\,z$, Fig. 2, the parts being arranged to discharge the shock.

Similar letters of reference indicate corresponding parts.

This invention relates to a new and improved device which may be applied to any reaper or harvester so as to discharge Indian corn or maize in shocks or bundles of any suitable or desired size.

A represents a reaper or harvester constructed in any of the known ways, and B is a rectangular inclined frame, which is secured to the upper end of a revolving upright, $C^\times$, in the reaper or harvester frame. This upright $C^\times$ has a pulley, D, upon it, around which a band, E, passes, said band also passing around a windlass, F, which serves as a seat for the driver.

Within the frame B there is placed a sliding frame, C, having racks $a$ at its under side, into which pinions H gear, said pinions H being on a shaft, I, which is placed transversely in the frame B, and has a crank, J, at each end of it.

By turning the shaft I the frame C may be raised and lowered, and said frame is provided with sides $b\,b$ to hold the cut stalks, which, as they are cut, fall back on the frame C between the sides $b\,b$.

To the rear of the sides $b\,b$ of the frame C two bars, $c\,c$, are secured by pivots $d$, and these bars $c\,c$ are connected by cross-bars $e$, which may be of metal. These parts compose a clamp, K, to hold the cut stalks in the frame C after a sufficient quantity have been cut to form a shock, and this clamp is placed in an upright position when the cutting device is in operation, in order to admit of the cut stalks falling within frame C. (See more particularly Fig. 1.)

The cutting device L may be of the ordinary reciprocating kind, such as are used on the generality of reapers or harvesters.

When a sufficient quantity of stalks have been cut to form a shock the driver stops the team, turns down the clamp K upon the cut stalks, and secures the former in position by any suitable fastening, and then by turning the windlass F turns the frame B, and consequently the frame C with its load of cut stalks, around to a position at right angles to that which it previously had. The driver then turns the shaft I and thereby moves forward or outward the frame C until projections $f$ at its rear end come in line with slots or openings $g$ in the guides $h\,h$, between which the frame C works, when said frame will immediately tilt on front projections, $f'$, to a vertical position, as shown in Fig. 3, and the clamp K being then unfastened and turned outward, the shock is discharged with the butts of stalks resting upon the ground. The frame C is then turned down in the frame B and moved back therein, and the frame B moved or turned back to its original position, the clamp K raised, and the implement again drawn along until a sufficient number of stalks are cut to form a succeeding shock, which is discharged in the same way as the one previously described.

This invention is extremely simple and may be operated by a single person—the driver—with the greatest facility.

Having thus described my invention, I claim as new and desire to secure by Letters Patent—

1. The revolving frame B, in combination with the sliding frame C, applied to a harvester, or a mounted frame provided with a cutting device, substantially as and for the purpose herein set forth.

2. The turning of the frame B through the medium of a windlass, F, arranged to serve as a driver's seat.

3. The clamp K, or its equivalent, in combination with the revolving or turning frame B and sliding frame C, substantially as and for the purpose specified.

THOMAS BOYD

Witnesses:
JOHN TREADWAY,
JOHN LEYNER.